(12) United States Patent
Tan (10) Patent No.: US 11,346,967 B2
(45) Date of Patent: May 31, 2022

(54) SYSTEMS AND METHODS FOR PROVIDING AMPLITUDE VERSUS OFFSET COMPLIANT MIGRATION GATHERS

(71) Applicant: Advanced Geophysical Technology Inc., Sugar Land, TX (US)

(72) Inventor: Lijian Tan, Sugar Land, TX (US)

(73) Assignee: Advanced Geophysical Technology Inc., Houston, TX (US)

( * ) Notice: Subject to any disclaimer, the term of this patent is extended or adjusted under 35 U.S.C. 154(b) by 371 days.

(21) Appl. No.: 16/565,612

(22) Filed: Sep. 10, 2019

(65) Prior Publication Data
US 2021/0072415 A1 Mar. 11, 2021

(51) Int. Cl.
*G01V 1/28* (2006.01)
*G01V 1/00* (2006.01)
*G01V 1/30* (2006.01)

(52) U.S. Cl.
CPC .............. *G01V 1/282* (2013.01); *G01V 1/003* (2013.01); *G01V 1/301* (2013.01)

(58) Field of Classification Search
CPC ........ G01V 1/301; G01V 1/282; G01V 1/003; G01V 2210/51; G01V 1/307; G01V 1/28; G01V 1/364; G01V 2210/512; G01V 2210/632
See application file for complete search history.

(56) References Cited

U.S. PATENT DOCUMENTS

| 10,884,148 | B2 * | 1/2021 | Calderon | G01V 1/282 |
| 2011/0218737 | A1 * | 9/2011 | Gulati | G06T 15/00 702/16 |
| 2011/0288831 | A1 * | 11/2011 | Tan | G01V 1/28 703/2 |
| 2011/0295510 | A1 * | 12/2011 | Gulati | G01V 1/288 702/16 |
| 2018/0275302 | A1 * | 9/2018 | Calderon | G01V 1/282 |

* cited by examiner

*Primary Examiner* — Isam A Alsomiri
*Assistant Examiner* — Amie M Ndure
(74) *Attorney, Agent, or Firm* — Finnegan, Henderson, Farabow, Garrett & Dunner, LLP (57) ABSTRACT

Methods and systems for adjusting migration gather are disclosed. A method for adjusting migration gather may include generating a first migration gather based on acquired seismic data. The method may also include generating a compensation volume based on reference data produced utilizing a reference seismic model. The method may further include applying the compensation volume to adjust the first migration gather.

9 Claims, 9 Drawing Sheets

SYSTEMS AND METHODS FOR PROVIDING AMPLITUDE VERSUS OFFSET COMPLIANT MIGRATION GATHERS

TECHNICAL FIELD

The specification relates generally to geophysics and reflection seismology, and more particularly, to systems and methods for providing amplitude versus offset compliant migration gathers.

BACKGROUND

Seismic exploration involves detection of subsurface formations. Seismic data may be obtained by generating, e.g., using vibrators or explosive detonations, seismic energy that can travel through a subsurface and recording, e.g., using an array of sensors or receivers, the reflections of that energy after it has traveled through the subsurface. The recorded seismic data may then be processed using data-processing techniques referred to as seismic migrations. Seismic migrations may geometrically relocate seismic events in space or time to the locations where seismic events occurred in the subsurface, thereby creating more accurate images of the subsurface. Reverse time migration (RTM) and Kirchhoff migration are two exemplary types of seismic migrations commonly used in the industry.

The primary output of a seismic migration is referred to as a gather. Gathers may be utilized for various purposes, including, e.g., building velocity models of the subsurface and creating or enhancing stacked images of the subsurface. As the industry continues to improve the efficiency and quality of gathers, there is also a need to make gathers amplitude versus offset (AVO) compliant. To be AVO-compliant, gathers should preserve the true amplitude of seismic signals that are representative of the subsurface and eliminate the noise.

SUMMARY

In one aspect, a computer-implemented method for adjusting migration gather is disclosed. The method may include: generating a first migration gather based on acquired seismic data; generating a compensation volume based on reference data produced utilizing a reference seismic model; and applying the compensation volume to adjust the first migration gather.

In another aspect, a system for adjusting migration gather is disclosed. The system may include one or more memory devices storing instructions and one or more processors configured to execute the instructions to perform operations. The operations may include: generating a first migration gather based on acquired seismic data; generating a compensation volume based on reference data produced utilizing a reference seismic model; and applying the compensation volume to adjust the first migration gather.

In still another aspect, a non-transitory computer-readable storage medium storing instructions that, when executed by a processor of a system, cause the system to perform a method for adjusting migration gather is disclosed. The method may include: generating a first migration gather based on acquired seismic data; generating a compensation volume based on reference data produced utilizing a reference seismic model; and applying the compensation volume to adjust the first migration gather.

BRIEF DESCRIPTION OF THE DRAWINGS

The accompanying drawings, which are incorporated in and constitute a part of this specification, illustrate embodiments. In the following description, which refers to the drawings, the same numbers in different drawings represent the same or similar elements unless otherwise represented.

DETAILED DESCRIPTION

Embodiments of the present disclosure provide systems and methods for providing migration gathers, e.g., RTM gathers, that are AVO-compliant. AVO is a general term referring to the dependency of seismic attribute (amplitude) with the distance between the source and receiver (offset). AVO analysis is a technique that geophysicists can execute on seismic data to determine, e.g., a rock's fluid content, porosity, density or seismic velocity, shear wave information, fluid indicators (hydrocarbon indications), and the like. However, because subsurface of Earth is complex, designing an RTM migration to achieve AVO-compliance is challenging.

To achieve AVO-compliance, one of the key issues is to properly compensate geometry spreading and transmission loss. The systems and methods configured in accordance with embodiments of the present disclosure can determine how to properly compensate for the geometry spreading and transmission loss utilizing a reference seismic model. As will be described in detail below, the reference seismic model may be utilized to facilitate generations of compensation volumes, which may be applied to the migration gathers to make the migration gathers AVO-compliant.

Figure 1:
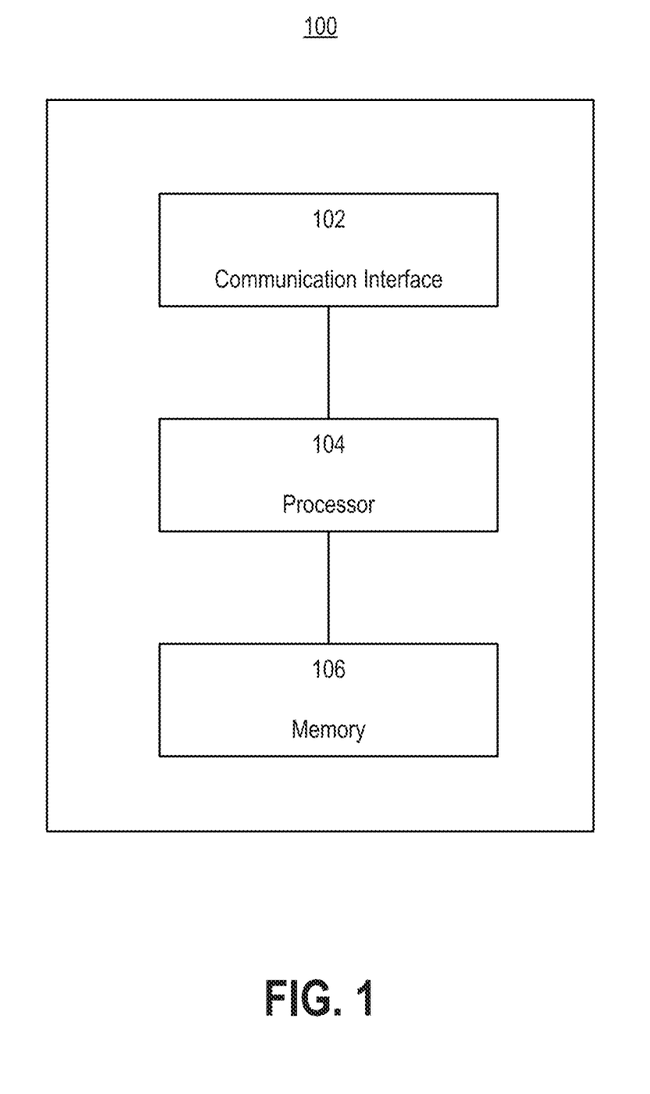
FIG. 1 is a block diagram of a computing device for providing an AVO-compliant migration gather, according to an embodiment.

FIG. 1 illustrates a schematic diagram of a computing device 100 for providing an AVO-compliant migration gather, according to an embodiment. Referring to FIG. 1, the computing device 100 may include a communication interface 102, a processor 104, and a memory 106.

The communication interface 102 may facilitate communications between the computing device 100 and various types of sensors or receivers utilized to record seismic signals. In some embodiments, the communication interface 102 is configured to support one or more communication standards, such as an Internet standard or protocol, an Integrated Services Digital Network (ISDN) standard, etc. In some embodiments, the communication interface 102 may include one or more of a Local Area Network (LAN) card, a cable modem, a satellite modem, a data bus, a universal serial bus, a cable, a wireless communication channel, a radio-based communication channel, a cellular communication channel, an Internet Protocol (IP) based communication device, or other communication devices for wired and/or wireless communications. In some embodiments, the communication interface 102 may be based on public cloud infrastructure, private cloud infrastructure, hybrid public/private cloud infrastructure.

The processor 104 may include one or more dedicated processing units, application-specific integrated circuits (ASICs), field-programmable gate arrays (FPGAs), or various other types of processors or processing units. The processor 104 may be coupled with the memory 106 and may be configured to execute instructions stored in the memory 106.

The memory 106 may store processor-executable instructions and data. The memory 106 may include any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, or a magnetic or optical disk. When the instructions in the memory 106 are executed by the processor 104, the computing device 100 may perform operation to provide an AVO-compliant migration gather.

Figure 2:
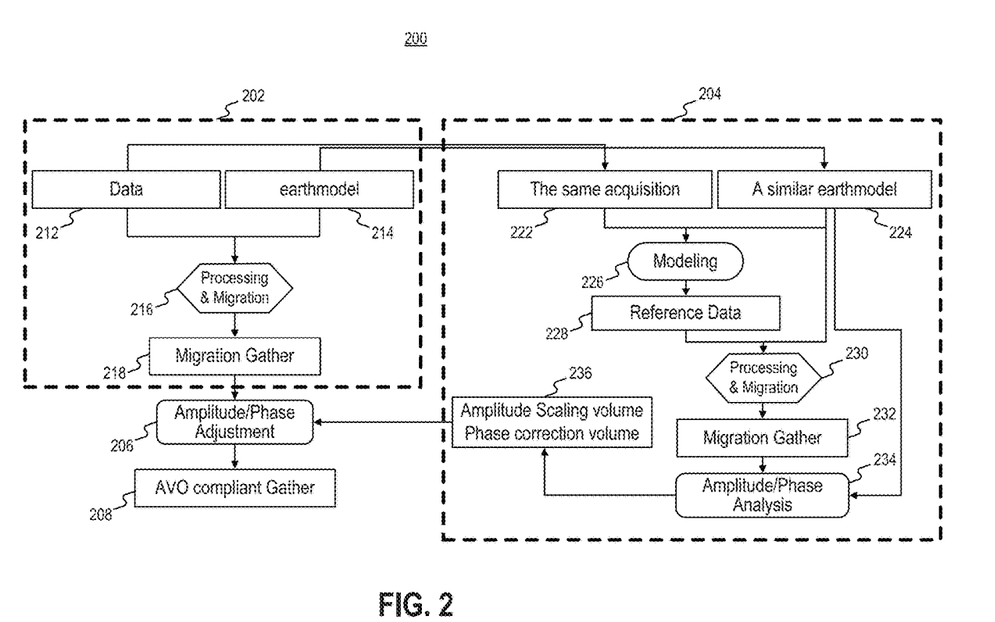
FIG. 2 is a flow chart of a method for providing an AVO-compliant migration gather, according to an embodiment.

FIG. 2 illustrates a flow chart of a method 200 for providing an AVO-compliant migration gather, according to an embodiment. The method 200 may be performed by a computing device, e.g., the computing device 100 (FIG. 1).

At step 202, the computing device 100 may generate a first migration gather 218. At step 204, the computing device 100 may generate one or more compensation volumes 236, which may be applied to the first migration gather 218 at step 206 to produce an AVO-compliant migration gather 208.

In some embodiments, the computing device 100 may generate the first migration gather 218 by providing a set of seismic data 212 and an earth model 214 to a seismic migration process 216. The seismic data 212 may be acquired under specified acquisition conditions, e.g., by generating seismic energy and recording reflections of the seismic energy at specified locations. The earth model 214 may be a representation of, e.g., a subsurface of the earth using parameters such as migration velocity of seismic energy that travels through the subsurface and density of the subsurface. For example, at different locations of the subsurface, there may be different values for the migration velocity and different values for the density. The seismic migration process 216 may implement a migration process currently known or later developed to process the acquired seismic data 212. In some embodiments, the seismic migration process 216 may implement a conventional reverse time migration (RTM) process or Kirchhoff migration process, such as the processes described in Baysal et al., "Reverse time migration," Geophysics, Vol. 48, No. 11 (November 1983):1514-1524, or in Lumley et al., "Anti-Aliased Kirchhoff 3-D Migration," Stanford Exploration Project, Report 80, 1994, both of which are herein incorporated by reference in their entirety. The seismic migration process 216 may geometrically relocate seismic events in space or time to the locations where seismic events occurred in the subsurface. The seismic migration process 216 may produce the first migration gather 218 as its output.

In some embodiments, the computing device 100 may generate the compensation volumes 236 based on reference data 228 produced by a reference seismic model 226 depicted in FIG. 2. The reference seismic model 226 may receive, as input, data representing the same acquisition conditions 222 as used to acquire the seismic data 212, including, e.g., the source receiver patterns and the like. The reference seismic model 226 may then simulate the generation of seismic energy and recordation of reflections of the seismic energy at locations specified in the acquisition conditions 222 to produce a set of reference data 228.

In some embodiments, the reference seismic model 226 may generate the reference data 228 by solving a mathematical wave propagation model, such as the model described in Hilterman, "Three-Dimensional Seismic Modeling," Geophysics, Vol. 35, No. 6 (December 1970):1020-1037, which is herein incorporated by reference in its entirety. An example of the mathematical wave propagation model may be expressed in a variable density acoustic wave equation as follows:

$$\frac{1}{C^2\rho}\frac{\partial^2 P}{\partial t^2} = \frac{\partial}{\partial x}\left(\frac{1}{\rho}\frac{\partial P}{\partial x}\right) + \frac{\partial}{\partial z}\left(\frac{1}{\rho}\frac{\partial P}{\partial z}\right) + f,$$

where P is the acoustic pressure to be solved as a function of time and a location specified by x and z. $\rho$ and C are functions of location x and z, and are used to represent density and acoustic wave velocity. $\rho$ and C may also be referred to as an earth model, which is one of the inputs for seismic modeling. $f$ is a source term, which is a specified time variable function at a source location (e.g., at x_source and z_source) and zero everywhere else. After P is numerically solved, the solution may be extracted at certain locations, e.g., receiver locations. The source and receiver locations may be referred to as acquisitions, which can be used as inputs for seismic modeling.

Figure 3:
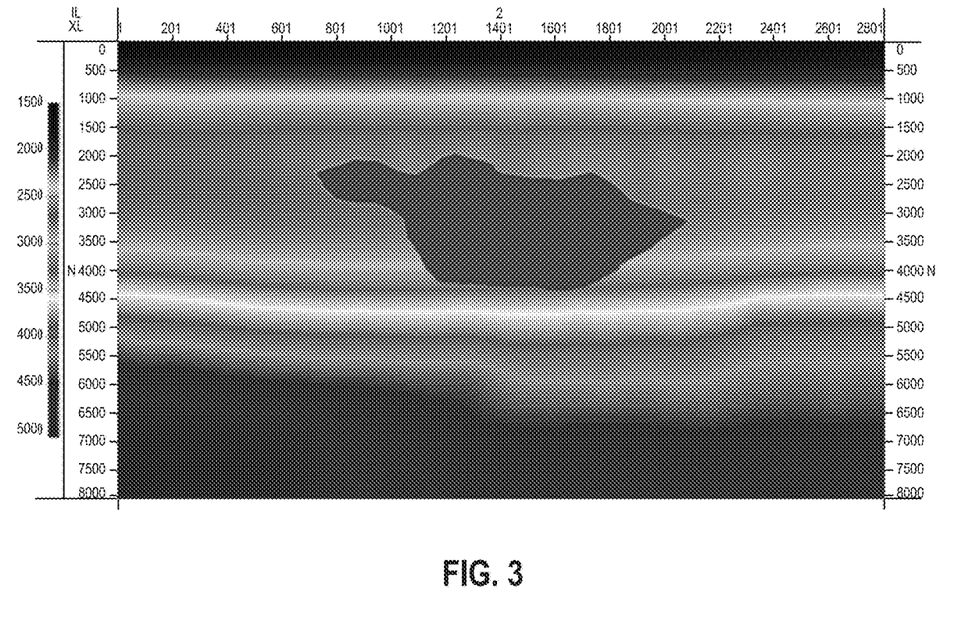
FIG. 3 is an illustration depicting a velocity model utilized by a reference earth model, according to an embodiment.

In some embodiments, the reference seismic model 226 may carry out the simulation using a reference earth model 224 that is configured to be similar, but not identical, to the earth model 214. In some embodiments, the reference earth model 224 and the earth model 214 may model migration velocity in the same manner, but may model subsurface density differently. For example, the reference earth model 224 may utilize an exemplary velocity model depicted in FIG. 3, where the horizontal axis represents the value of XL coordinate and the vertical axis represents the depth from earth surface. More specifically, as shown in FIG. 3, the values of XL and IL represent coordinates defined for convenience of seismic data modeling and processing. The values of XL and IL may be obtained by linear mapping (e.g., scaling, rotating, or shifting) of the X and Y coordinates, and in the example depicted in FIG. 3, the value of IL may remain constant. In some embodiments, this velocity mode may be identical to the velocity model utilized in the earth model 214.

Figure 4:
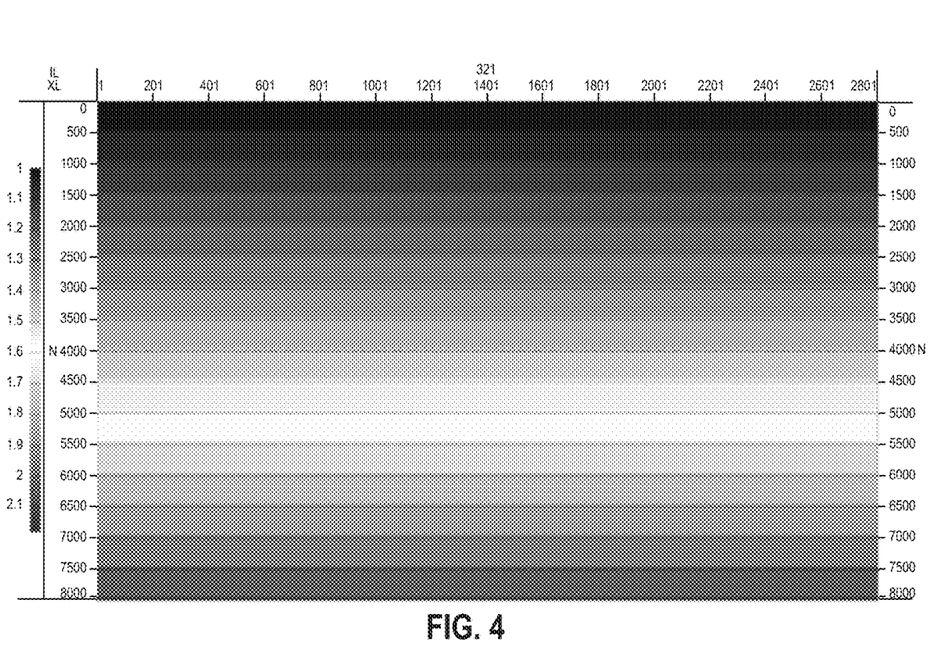
FIG. 4 is an illustration depicting a density model utilized by a reference earth model, according to an embodiment.

In some embodiments, the reference earth model 224 may utilize a density model depicted in FIG. 4, where the horizontal axis represents the value of XL coordinate and the vertical axis represents the depth from earth surface horizontal axis. It is noted that this density model is a horizontal layered density model with a constant density change ratio between neighboring layers, which is different from the density model used in the earth model 214. More specifically, it is noted that the earth model 214 may not need to use a density model, which is included as a part of the reference earth model 224. In this manner, the reference seismic model 226 may simulate the generation of seismic energy and recordation of reflections of the seismic energy at locations specified in the acquisition conditions 222, by performing a variable density acoustic seismic modeling using the reference earth model 224 to produce the set of reference data 228. It is contemplated that the reference data 228 produced in this manner may be closely related to the acquired seismic data 212 without being identical to the acquired seismic data 212.

Referring back to FIG. 2, once the set of reference data 228 is produced, the computing device 100 may provide the set of reference data 228 and the reference earth model 224 to a seismic migration process 230 to generate a second migration gather 232. In some embodiments, the seismic migration process 230 may implement the same migration process as the seismic migration process 216. In this manner, the computing device 100 can determine how to adjust the second migration gather 232 to make the second migration gather 232 AVO-compliant, and then apply the same adjustments, as compensation volumes 236, to the first migration gather 218 at step 206 to produce the AVO-compliant migration gather 208.

For illustrative purposes, the second migration gather 232 may be referred to as the reference migration gather 232 because it is generated based on the reference data 228. The first migration gather 218, on the other hand, may be referred to as the acquired migration gather 218 because it is generated based on acquired seismic data 212.

In some embodiments, the computing device 100 may determine how to adjust the reference migration gather 232 by performing an amplitude and phase analysis 234. Because the velocity and density used in the reference earth model 224 is known to the computing device 100 when the computing device 100 performs the amplitude and phase analysis 234, the computing device 100 can calculate the expected AVO response at all image points for all offsets. The computing device 100 may determine how the reference migration gather 232 deviated from the expected AVO response. The computing device 100 may recognize the deviations and utilize the deviations to determine the proper amplitude/phase adjustments that should be applied to the reference migration gather 232. The computing device 100 may then apply the same adjustments to the acquired migration gather 218 at step 206 to produce the AVO-compliant migration gather 208.

In some embodiments, the computing device 100 may determine how the reference migration gather 232 deviated from the expected AVO response based on the relationships between amplitude versus offset or amplitude versus angle in the reference migration gather 232. It is to be understood that at any image point, the amplitude versus offset or amplitude versus angle relation in the reference migration gather 232 may approximately satisfy the following equation:

$$R(\theta) = R(0) + G \sin^2(\theta)$$

with $$G = \frac{1}{2} \frac{\Delta V_P}{V_P} - 2 \frac{V_S^2}{V_P^2} \left( \frac{\Delta \rho}{\rho} + 2 \frac{\Delta V_S}{V_S} \right)$$

and $$R(0) = \frac{1}{2} \left( \frac{\Delta \rho}{\rho} + \frac{\Delta V_P}{V_P} \right)$$

where R represents reflection coefficient that is related with angle θ, G represents an AVO gradient, which describes the variation of reflection amplitudes at intermediate offsets, $V_P$ represents acoustic wave propagation velocity, $V_S$ represents shear wave propagation velocity, θ represents incidence angle, which represents the angle between wave propagation direction and normal direction of the reflection surface, and ρ represents density.

It is noted that because velocity used for seismic modeling is smooth at all locations of the model except at crucial geology interfaces such as sea floor and salt boundary, and because the simulation is acoustic, all terms in $$G = \frac{1}{2} \frac{\Delta V_P}{V_P} - 2 \frac{V_S^2}{V_P^2} \left( \frac{\Delta \rho}{\rho} + 2 \frac{\Delta V_S}{V_S} \right)$$

vanishes, that is, G becomes 0. Therefore, constant amplitude versus offset response is expected at all image points that are not on geology interfaces such as sea floors or salt boundaries. Moreover, because the reference earth model 224 is configured to utilize a layered density model with a constant density change ratio between neighboring layers, the reflection coefficient at each density layer interface is expected to be constant as $$R(0) = \frac{1}{2} \left( \frac{\Delta \rho}{\rho} + \frac{\Delta V_P}{V_P} \right)$$

becomes a constant value. Thus, utilizing the reference earth model 224 should lead to constant AVO response at all image points for all offsets. However, due to factors such as acquisition, illumination, and the choice of migration algorithm or migration parameters used in generating the reference migration gather 232, the reference migration gather 232 may contain some deviations from the expected constant AVO response. These deviations may allow the computing device 100 to determine how the reference migration gather 232 deviated from the expected AVO response. In this manner, the computing device 100 can determine how to adjust the reference migration gather 232 to make the reference migration gather 232 AVO-compliant and apply the same adjustment to the acquired migration gather 218 at step 206 to produce the AVO-compliant migration gather 208.

Figure 5:
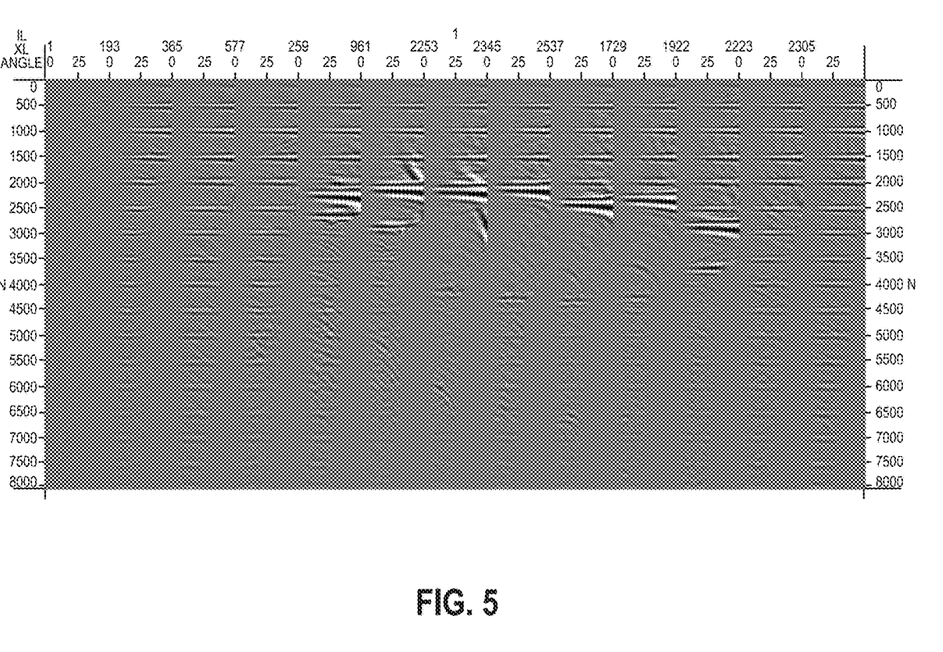
FIG. 5 is an illustration depicting a reference migration gather, according to an embodiment.
Figure 6:
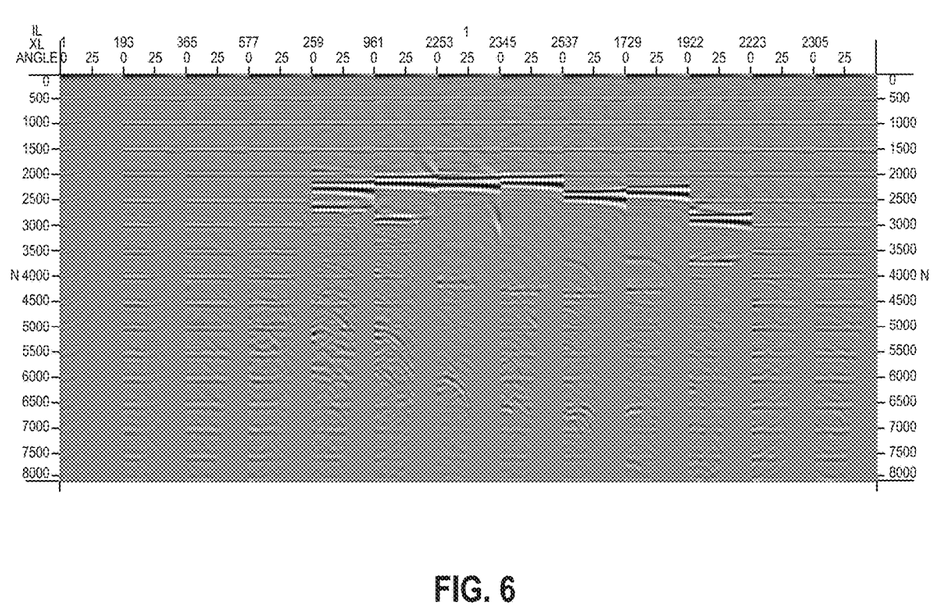
FIG. 6 is an illustration depicting an adjusted reference migration gather, according to an embodiment.

Referring now generally to FIGS. 5-6. FIG. 5 illustrates a reference migration gather (e.g., the reference migration gather 232, FIG. 2) generated using a set of reference data 228 (FIG. 2). The horizontal axis of the reference migration gather represents the value of XL coordinate and the vertical axis of the reference migration gather represents the depth from earth surface. It is noted that this reference migration gather contains deviations from the expected constant AVO response. The computing device 100 (FIG. 1) can use these deviations to determine the compensation volumes, e.g., in terms of amplitude/phase adjustments, that can be applied to the reference migration gather to make the reference migration gather AVO-compliant. FIG. 6 illustrates an adjusted reference migration gather after applying the compensation volumes, making the adjusted reference migration gather AVO-compliant. The horizontal axis of the adjusted reference migration gather represents the value of XL coordinate and the vertical axis of the adjusted reference migration gather represents the depth from earth surface.

Figure 7:
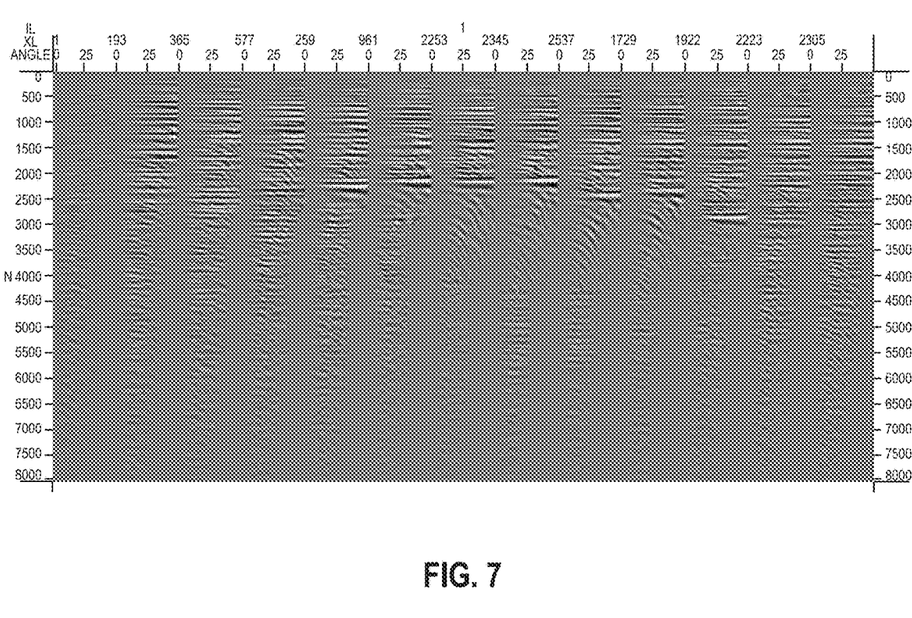
FIG. 7 is an illustration depicting an acquired migration gather, according to an embodiment.
Figure 8:
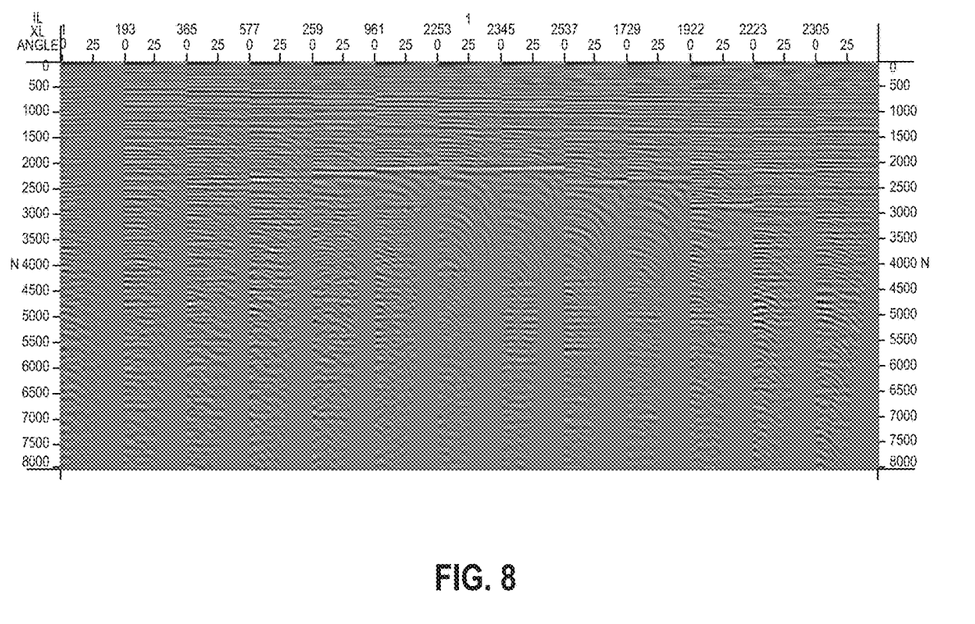
FIG. 8 is an illustration depicting an adjusted acquired reference migration gather, according to an embodiment.

Referring now generally to FIGS. 7-8. FIG. 7 illustrates an acquired migration gather (e.g., the acquired migration gather 218, FIG. 2) generated using a set of acquired seismic data 212 (FIG. 2). The horizontal axis of the acquired migration gather represents the value of XL coordinate and the vertical axis of the acquired migration gather represents the depth from earth surface. Once the computing device 100 determines the compensation volumes as described above, the computing device 100 may apply the same compensation volumes to the acquired migration gather shown in FIG. 7 to produce an adjusted migration gather shown in FIG. 8, making the adjusted migration gather shown in FIG. 8 AVO-compliant. The horizontal axis of the adjusted migration gather shown in FIG. 8 represents the value of XL coordinate and the vertical axis of the adjusted migration gather shown in FIG. 8 represents the depth from earth surface.

Figure 9:
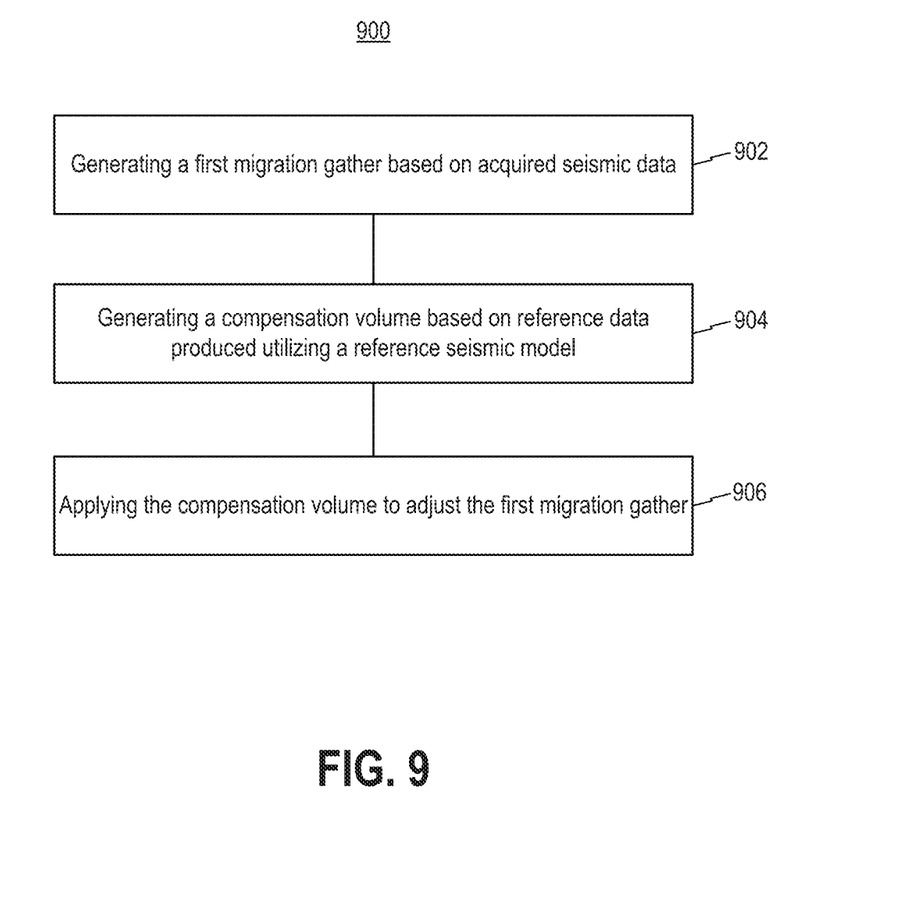
FIG. 9 is a flow chart of a method for adjusting migration gather, according to an embodiment.

Referring now to FIG. 9, there is shown a flow diagram illustrating a method 900 for adjusting migration gather. While the method 900 is described herein as a sequence of steps, it is to be understood that the order of the steps may vary in other implementations. In particular, steps may be performed in any order, or in parallel. It is to be understood that steps of the method 900 may be performed by one or more processors, computers, servers, controllers or the like.

In some embodiments, the method 900 may be performed by the computing device 100 (as depicted in FIG. 1). At step 902, the method 900 may generate a first migration gather (e.g., the first migration gather 218, FIG. 2) based on acquired seismic data.

At step 904, the method 900 may generate a compensation volume (e.g., the compensation volume 236, FIG. 2) based on reference data produced utilizing a reference seismic model. In some embodiments, the method 900 may receive data representing acquisition conditions used to acquire the seismic data and simulate, utilizing the reference seismic model, generation of seismic energy and recordation of reflections of the seismic energy at locations specified in the acquisition conditions to produce the reference data.

In some embodiments, the reference seismic model may be configured to carry out the simulation using a reference earth model that models migration velocity in a same manner as an earth model utilized to generate the first migration gather. In some embodiments, the reference earth model may model subsurface density in a different manner compared to the earth model utilized to generate the first migration gather. For example, in some embodiments, the reference earth model may model density utilizing a horizontal layered density model with a constant density change ratio between neighboring layers, as described above. Also as described above, in some embodiments, the method 900 may generate the compensation volume by generating a second migration gather based on the reference data and the reference earth model, performing amplitude and phase analysis on the second migration gather to determine a deviation of the second migration gather from an expected AVO response, and determining the compensation volume based on the determined deviation.

At step 906, the method 900 may apply the compensation volume to adjust the first migration gather, making the first migration gather AVO-compliant.

In some embodiments, some or all of the steps for the above described techniques may be implemented as a computer program or application or as a plug-in module or subcomponent of another application. The described techniques may be varied and are not limited to the examples or descriptions provided.

In an embodiment, there is also provided a non-transitory computer-readable storage medium storing instructions that, when executed by a processor of a computer system, cause the computer system to perform the above described methods.

While illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of steps may be modified, and steps may be added or deleted.

Thus, the foregoing description has been presented for purposes of illustration only. It is not exhaustive and is not limited to the precise forms or embodiments disclosed. Modifications and adaptations will be apparent to those skilled in the art from consideration of the specification and practice of the disclosed embodiments.

The claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps.

Furthermore, although aspects of the disclosed embodiments are described as being associated with data stored in memory and other tangible computer-readable storage mediums, one skilled in the art will appreciate that these aspects may also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead is defined by the appended claims in light of their full scope of equivalents.

What is claimed is:

1. A computer-implemented method for adjusting migration gather, the method comprising:
   receiving data representing acquisition conditions used to acquire seismic data;
   simulating, utilizing a reference seismic model, generation of seismic energy and recordation of reflections of the seismic energy at locations specified in the acquisition conditions to produce reference data;
   generating a first migration gather based on the acquired seismic data;
   generating a compensation volume based on the reference data produced utilizing the reference seismic model; and
   applying the compensation volume to adjust the first migration gather;
   wherein the reference seismic model is configured to carry out simulation using a reference earth model that models migration velocity in a same manner as an earth model utilized to generate the first migration gather, the reference earth model models subsurface density in a different manner compared to the earth model utilized to generate the first migration gather, and the reference earth model models the subsurface density utilizing a horizontal layered density model with a constant density change ratio between neighboring layers.

2. The method of claim 1, wherein generating the compensation volume further comprises:
   generating, utilizing a seismic migration process, a second migration gather based on the reference data and the reference earth model;

performing amplitude and phase analysis on the second migration gather to determine a deviation of the second migration gather from an expected amplitude versus offset (AVO) response; and determining the compensation volume based on the determined deviation.

3. The method of claim 1, wherein the first migration gather is generated utilizing a reverse time migration (RTM) process.

4. A system, comprising:
one or more memory devices storing instructions; and
one or more processors configured to execute the instructions to perform operations comprising:
receiving data representing acquisition conditions used to acquire seismic data;
simulating, utilizing a reference seismic model, generation of seismic energy and recordation of reflections of the seismic energy at locations specified in the acquisition conditions to produce reference data;
generating a first migration gather based on the acquired seismic data;
generating a compensation volume based on the reference data produced utilizing the reference seismic model; and
applying the compensation volume to adjust the first migration gather;
wherein the reference seismic model is configured to carry out simulation using a reference earth model that models migration velocity in a same manner as an earth model utilized to generate the first migration gather, the reference earth model models subsurface density in a different manner compared to the earth model utilized to generate the first migration gather, and the reference earth model models the subsurface density utilizing a horizontal layered density model with a constant density change ratio between neighboring layers.

5. The system of claim 4, wherein generating the compensation volume further comprises:
generating, utilizing a seismic migration process, a second migration gather based on the reference data and the reference earth model;
performing amplitude and phase analysis on the second migration gather to determine a deviation of the second migration gather from an expected amplitude versus offset (AVO) response; and
determining the compensation volume based on the determined deviation.

6. The system of claim 4, wherein the first migration gather is generated utilizing a reverse time migration (RTM) process.

7. A non-transitory computer-readable storage medium storing instructions that, when executed by a processor of a system, cause the system to perform a method for adjusting migration gather, the method comprising:
receiving data representing acquisition conditions used to acquire seismic data;
simulating, utilizing a reference seismic model, generation of seismic energy and recordation of reflections of the seismic energy at locations specified in the acquisition conditions to produce reference data;
generating a first migration gather based on the acquired seismic data;
generating a compensation volume based on the reference data produced utilizing the reference seismic model; and
applying the compensation volume to adjust the first migration gather;
wherein the reference seismic model is configured to carry out simulation using a reference earth model that models migration velocity in a same manner as an earth model utilized to generate the first migration gather, the reference earth model models subsurface density in a different manner compared to the earth model utilized to generate the first migration gather, and the reference earth model models subsurface density utilizing a horizontal layered density model with a constant density change ratio between neighboring layers.

8. The non-transitory computer-readable storage medium of claim 3, wherein generating the compensation volume further comprises:
generating, utilizing a seismic migration process, a second migration gather based on the reference data and the reference earth model;
performing amplitude and phase analysis on the second migration gather to determine a deviation of the second migration gather from an expected amplitude versus offset (AVO) response; and
determining the compensation volume based on the determined deviation.

9. The non-transitory computer-readable storage medium of claim 7, wherein the first migration gather is generated utilizing a reverse time migration (RTM) process.

* * * * *

UNITED STATES PATENT AND TRADEMARK OFFICE
CERTIFICATE OF CORRECTION

PATENT NO. : 11,346,967 B2
APPLICATION NO. : 16/565612
DATED : May 31, 2022
INVENTOR(S) : Lijian Tan It is certified that error appears in the above-identified patent and that said Letters Patent is hereby corrected as shown below:

In the Claims

Claim 8, Column 10, Lines 33-34, "The non-transitory computer-readable storage medium of claim 3" should read --The non-transitory computer-readable storage medium of claim 7--.

Signed and Sealed this
Twelfth Day of July, 2022

Katherine Kelly Vidal
*Director of the United States Patent and Trademark Office*